(12) United States Patent
Oniwa et al.

(10) Patent No.: US 10,583,833 B2
(45) Date of Patent: Mar. 10, 2020

(54) VEHICLE CONTROL APPARATUS, VEHICLE CONTROL METHOD, AND VEHICLE CONTROL PROGRAM

(71) Applicant: HONDA MOTOR CO., LTD., Tokyo (JP)

(72) Inventors: Yoshihiro Oniwa, Utsunomiya (JP); Mineyuki Yoshida, Utsunomiya (JP); Hiroshi Oguro, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 97 days.

(21) Appl. No.: 15/297,234

(22) Filed: Oct. 19, 2016

(65) Prior Publication Data

US 2017/0120908 A1    May 4, 2017

(30) Foreign Application Priority Data

Oct. 28, 2015  (JP) .................................. 2015-212113

(51) Int. Cl.
*B60W 30/10*     (2006.01)
*B60W 50/00*     (2006.01)
(Continued)

(52) U.S. Cl.
CPC ............ *B60W 30/10* (2013.01); *B60W 10/20* (2013.01); *B60W 30/18027* (2013.01); *B60W 30/18163* (2013.01); *B60W 50/0097* (2013.01); *B60W 50/0098* (2013.01); *B60W 50/082* (2013.01); *B60W 2050/0088* (2013.01); *B60W 2050/0089* (2013.01); *B60W 2420/42* (2013.01);

(Continued)

(58) Field of Classification Search
None
See application file for complete search history.

(56) References Cited

U.S. PATENT DOCUMENTS

| 2003/0127273 | A1* | 7/2003 | Fukumoto | ................ B62D 6/10 180/400 |
| 2010/0010701 | A1* | 1/2010 | Gartner | ............... B60T 8/17551 701/31.4 |

(Continued)

FOREIGN PATENT DOCUMENTS

| CN | 102548822 A | 7/2012 |
| CN | 104590251 A | 5/2015 |

(Continued)

OTHER PUBLICATIONS

English translation of JP2014139063 (Year: 2018).*

(Continued)

*Primary Examiner* — Nicholas K Wiltey
(74) *Attorney, Agent, or Firm* — Drinker Biddle & Reath LLP

(57) ABSTRACT

A vehicle control apparatus includes a generation unit configured to generate a locus of a position of an own vehicle for each predetermined time in a future as a trajectory of the own vehicle, a traveling control unit configured to control a traveling of the own vehicle on the basis of the trajectory generated by the generation unit, and a storage control unit configured to cause a storage unit to store information indicating a steering component corresponding to a trajectory previously generated by the generation unit when the own vehicle is stopped.

4 Claims, 14 Drawing Sheets

(51) Int. Cl.
  *B60W 30/18* (2012.01)
  *B60W 50/08* (2012.01)
  *B60W 10/20* (2006.01)

(52) U.S. Cl.
  CPC ..... *B60W 2420/52* (2013.01); *B60W 2510/18* (2013.01); *B60W 2510/20* (2013.01); *B60W 2540/18* (2013.01); *B60W 2550/402* (2013.01)

(56) References Cited

U.S. PATENT DOCUMENTS

| | | | | |
|---|---|---|---|---|
| 2011/0190982 | A1* | 8/2011 | Lavoie | B62D 15/021 |
| | | | | 701/41 |
| 2012/0185113 | A1* | 7/2012 | Pampus | B60W 30/06 |
| | | | | 701/1 |
| 2013/0110343 | A1 | 5/2013 | Ichikawa et al. | |
| 2016/0107682 | A1* | 4/2016 | Tan | B62D 6/00 |
| | | | | 701/41 |
| 2017/0074189 | A1* | 3/2017 | Oda | B60W 10/06 |
| 2018/0088572 | A1* | 3/2018 | Uchida | B60W 50/14 |
| 2018/0364723 | A1* | 12/2018 | Cullinane | G05D 1/0214 |
| 2019/0152520 | A1* | 5/2019 | Obermuller | B62D 7/159 |
| 2019/0315403 | A1* | 10/2019 | Irie | B62D 15/025 |

FOREIGN PATENT DOCUMENTS

| | | |
|---|---|---|
| JP | A-10-287262 | 10/1998 |
| JP | A-2005-153660 | 6/2005 |
| JP | A-2007-156890 | 6/2007 |
| JP | A-2009-184675 | 8/2009 |
| JP | A-2014-139063 | 7/2014 |
| WO | WO-2011/158347 A1 | 12/2011 |

OTHER PUBLICATIONS

JP Office Action dated Jun. 20, 2017 from corresponding Japanese patent application No. 2015-212113 (with attached English-language translation).

Chinese Office Action dated Sep. 30, 2018 that issued in Chinese Patent Application No. 201610909249.3, along with the English Translation of the Search Report.

* cited by examiner

VEHICLE CONTROL APPARATUS, VEHICLE CONTROL METHOD, AND VEHICLE CONTROL PROGRAM

CROSS REFERENCE TO RELATED APPLICATIONS

Priority is claimed on Japanese Patent Application No. 2015-212113, filed Oct. 28, 2015, the content of which is incorporated herein by reference.

BACKGROUND OF THE INVENTION

Field of the Invention

The present invention relates to a vehicle control apparatus, a vehicle control method, and a vehicle control program.

Description of Related Art

Research on technology for automatically driving a vehicle such as a four-wheeled vehicle has recently progressed.

In relation to this technology, there is a driving assistance device including an instruction means for issuing an instruction for starting automatic driving according to an operation of a driver, a setting means for setting a destination of the automatic driving, a determination means for determining a mode of the automatic driving according to whether a destination has been set when the driver operates the instruction means, and a control means for controlling the traveling of a vehicle on the basis of the mode of the automatic driving determined by the determination means, wherein the determination means determines the mode of the automatic driving as the automatic driving in which the vehicle travels along a current travel route of an own vehicle or an automatic stop when a destination is not set (for example, see WO 2011/158347).

SUMMARY OF THE INVENTION

However, in the conventional technology, it may be impossible to cause an own vehicle to smoothly travel in a desired direction at a traveling start time when the vehicle has stopped during traveling.

An aspect according to the present invention has been made in view of such circumstances, and an objective of the aspect is to provide a vehicle control apparatus, a vehicle control method, and a vehicle control program capable of causing an own vehicle to smoothly travel in a desired direction when the own vehicle starts to travel.

To achieve the above-mentioned objective, the present invention adopts the following aspects.

(1) According to an aspect of the present invention, a vehicle control apparatus is provided including: a generation unit configured to generate a locus of a position of an own vehicle for each predetermined time in a future as a trajectory of the own vehicle; a traveling control unit configured to control a traveling of the own vehicle on the basis of the trajectory generated by the generation unit; and a storage control unit configured to cause a storage unit to store information indicating a steering component corresponding to a trajectory previously generated by the generation unit when the own vehicle is stopped.

(2) In aspect (1), the traveling control unit may determine a steering angle when the traveling of the own vehicle starts on the basis of the information indicating the steering component stored in the storage unit.

(3) In aspect (1) or (2), the traveling control unit may maintain a steering angle of the own vehicle on the basis of the information indicating the steering component stored in the storage unit while the own vehicle is stopped.

(4) According to an aspect of the present invention, a vehicle control method of an on-vehicle computer is provided, the method including: generating a locus of a position of an own vehicle for each predetermined time in a future as a trajectory of the own vehicle; controlling traveling of the own vehicle on the basis of the generated trajectory; and causing a storage unit to store information indicating a steering component of a previously generated trajectory when the own vehicle is stopped.

(5) According to an aspect of the present invention, a vehicle control program is provided for causing an on-vehicle computer to: generate a locus of a position of an own vehicle for each predetermined time in a future as a trajectory of the own vehicle; control traveling of the own vehicle on the basis of the generated trajectory; and cause a storage unit to store information indicating a steering component of a previously generated trajectory when the own vehicle is stopped.

According to aspect (1), (4), or (5), it is possible to cause an own vehicle to smoothly travel in a desired direction when the own vehicle starts to travel because information indicating a steering component of a trajectory previously generated by the generation unit is stored in a storage unit when the own vehicle is stopped.

According to aspect (2), it is possible to cause an own vehicle to more precisely smoothly travel in a desired direction when the own vehicle starts to travel because the steering angle when the traveling of the own vehicle starts is determined on the basis of the information indicating the steering component stored in the storage unit.

According to aspect (3), it is possible to cause an own vehicle to more precisely smoothly travel in a desired direction when the own vehicle starts to travel because the steering angle of the own vehicle is maintained on the basis of the information indicating the steering component stored in the storage unit while the own vehicle is stopped.

DETAILED DESCRIPTION OF THE INVENTION

Hereinafter, embodiments of a vehicle control apparatus, a vehicle control method, and a vehicle control program of the present invention will be described with reference to the drawings.

First Embodiment

[Vehicle Configuration]

Figure 1:
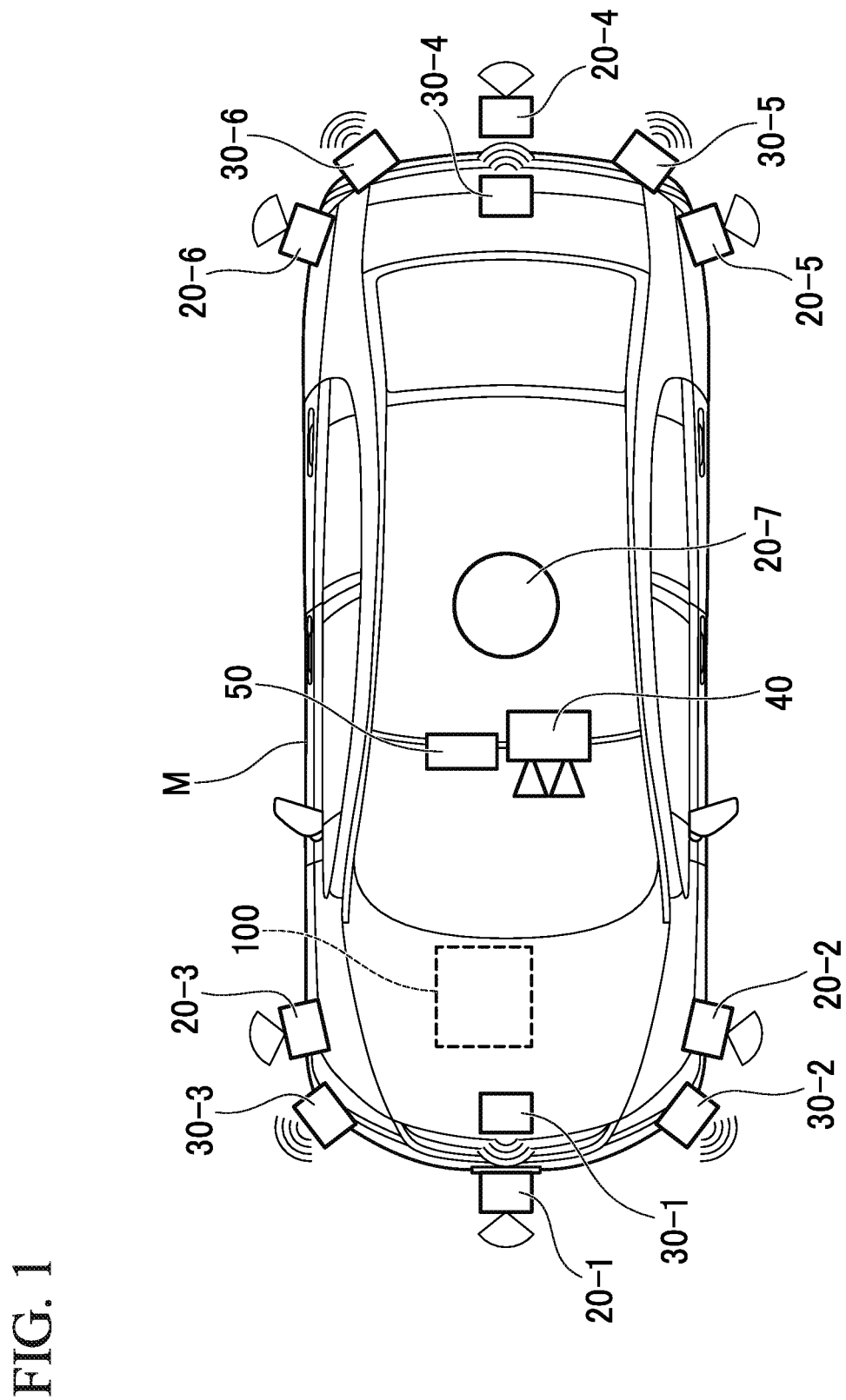
FIG. 1 is a diagram illustrating components provided in a vehicle equipped with a vehicle control apparatus 100 according to a first embodiment.

FIG. 1 is a diagram illustrating components provided in a vehicle (hereinafter referred to as an own vehicle M) equipped with a vehicle control apparatus 100 according to the first embodiment. The vehicle equipped with the vehicle control apparatus 100 is, for example, a vehicle with two wheels, three wheels, four wheels, or the like and includes a vehicle having an internal combustion engine such as a diesel engine or a gasoline engine as a power source, an electric vehicle having an electric motor as a power source, a hybrid vehicle having both an internal combustion engine and an electric motor, etc. Also the above-mentioned electric vehicle is driven using power discharged by, for example, a cell such as a secondary cell, a hydrogen fuel cell, a metal fuel cell, or an alcohol fuel cell.

As illustrated in FIG. 1, sensors such as finders 20-1 to 20-7, radars 30-1 to 30-6, and a camera 40, a navigation apparatus 50, and the above-mentioned vehicle control apparatus 100 are mounted in the own vehicle M. Each of the finders 20-1 to 20-7 is, for example, light detection and ranging or laser imaging detection and ranging (LIDAR) for measuring scattered light in regards to irradiation of light and measuring a distance to a target. For example, the finder 20-1 is attached to a front grille or the like and the finders 20-2 and 20-3 are attached to a side surface of a vehicle body, a door mirror, an inside of a head lamp, the vicinity of a side marker lamp, or the like. The finder 20-4 is attached to a trunk lid or the like and the finders 20-5 and 20-6 are attached to the side surface of the vehicle body, an inside of a taillight, or the like. The above-mentioned finders 20-1 to 20-6 have, for example, a detection area of about 150 degrees in a horizontal direction. Also, the finder 20-7 is attached to a roof or the like. The finder 20-7 has, for example, a detection area of 360 degrees in the horizontal direction.

Each of the above-mentioned radars 30-1 and 30-4 is, for example, a long-range millimeter wave radar having a wider detection area than other radars in a depth direction. Also, each of the radars 30-2, 30-3, 30-5, and 30-6 is a medium-range millimeter wave radar having a narrower detection area than the radars 30-1 and 30-4 in the depth direction. Hereinafter, the finders 20-1 to 20-7 are simply referred to as a "finder 20" unless otherwise specifically distinguished and the radars 30-1 to 30-6 are simply referred to as "radar 30" unless otherwise specifically distinguished. The radar 30 detects a physical object in, for example, a frequency modulated continuous wave (FM-CW) scheme.

The camera 40 is a digital camera using a solid-state imaging element such as, for example, a charge coupled device (CCD) or a complementary metal oxide semiconductor (CMOS). The camera 40 is attached to an upper portion of a front windshield, a backside of a rearview mirror, or the like. The camera 40, for example, periodically and iteratively images a front part of the own vehicle M.

Also, the configuration illustrated in FIG. 1 is merely an example, some of the components may be omitted, and other components may be further added.

Figure 2:
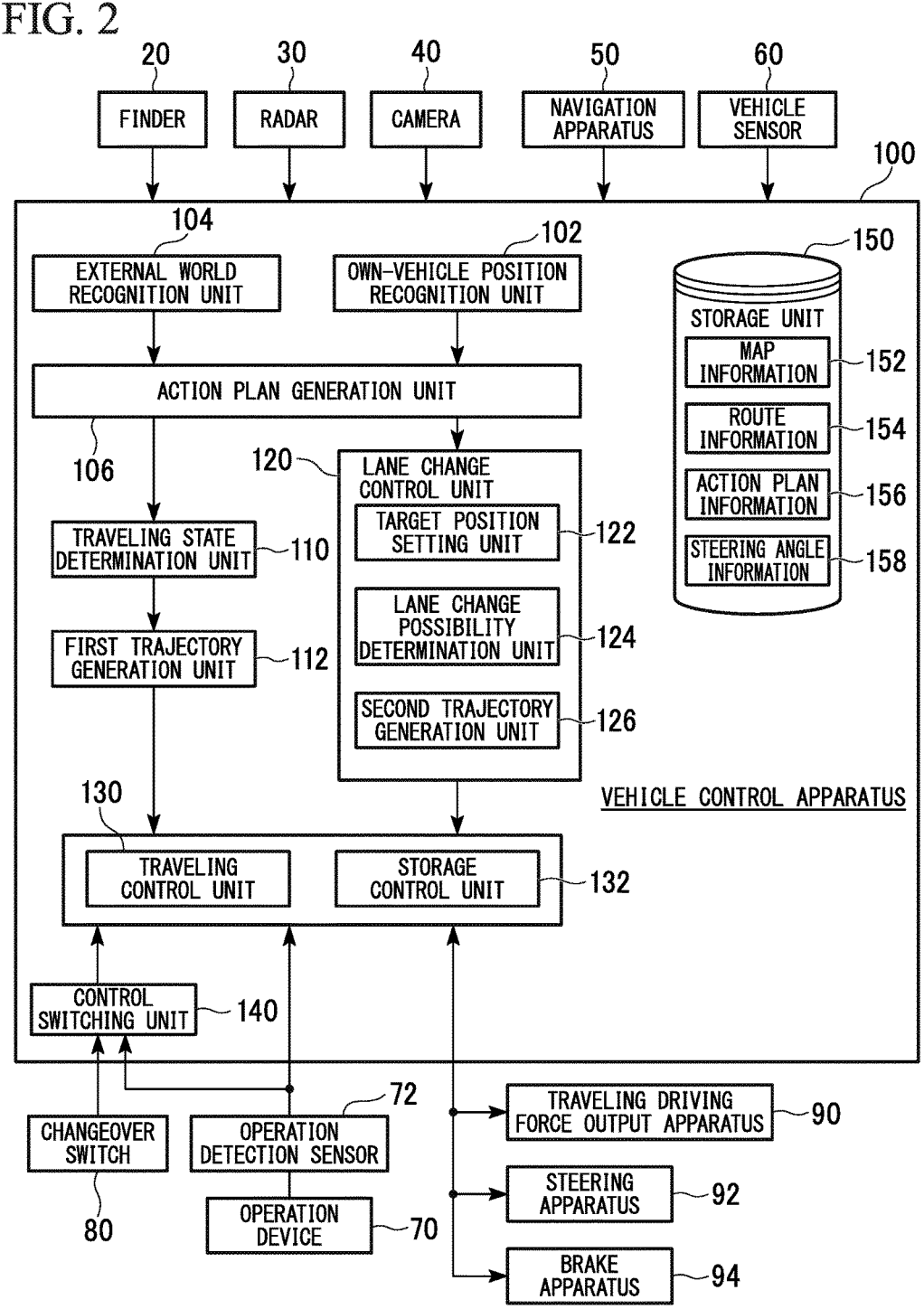
FIG. 2 is a functional configuration diagram of an own vehicle M focusing on the vehicle control apparatus 100 according to the first embodiment.

FIG. 2 is a functional configuration diagram of the own vehicle M focusing on the vehicle control apparatus 100 according to the first embodiment. The own vehicle M is equipped with the navigation apparatus 50, a vehicle sensor 60, an operation device 70, an operation detection sensor 72, a changeover switch 80, a traveling driving force output apparatus 90, a steering apparatus 92, a brake apparatus 94, and the vehicle control apparatus 100 in addition to the finder 20, the radar 30, and the camera 40. These apparatuses and devices are mutually connected through a multiplex communication line or a serial communication line such as a controller area network (CAN) communication line or a wireless communication network.

The navigation apparatus 50 has a global navigation satellite system (GNSS) receiver or map information (a navigation map), a touch panel type display apparatus which functions as a user interface, a speaker, a microphone, etc. The navigation apparatus 50 specifies a position of the own vehicle M using the GNSS receiver and derives a route from the position to a destination designated by a user. The route derived by the navigation apparatus 50 is stored in a storage unit 150 as route information 154. The position of the own vehicle M may be specified or complemented by an inertial navigation system (INS) using an output of the vehicle sensor 60. Also, the navigation apparatus 50 performs guidance by a sound or navigation display in regards to a route up to a destination when the vehicle control apparatus 100 executes a manual drive mode. Also, a configuration for specifying the position of the own vehicle M may be provided independently of the navigation apparatus 50. Also, the navigation apparatus 50 may be implemented by a function of a terminal apparatus such as, for example, a function of a smartphone possessed by the user or a terminal apparatus such as a tablet terminal. In this case, transmission/reception of information is performed wirelessly or through communication between the terminal apparatus and the vehicle control apparatus 100. Also, the configuration for specifying the position of the own vehicle M may be provided independently of the navigation apparatus 50.

The vehicle sensor 60 includes a vehicle speed sensor which detects vehicle speed, an acceleration sensor which detects acceleration, a yaw rate sensor which detects an angular speed around a vertical axis, an azimuth sensor which detects a direction of the own vehicle M, or the like.

The traveling driving force output apparatus 90 includes, for example, an engine and an engine electronic control unit (ECU) which controls the engine if the own vehicle M is a vehicle having an internal combustion engine as a power source, includes a traveling motor and a motor ECU which controls the traveling motor if the own vehicle M is an electric vehicle having an electric motor as a power source, and includes an engine, an engine ECU, a traveling motor, and a motor ECU if the own vehicle M is a hybrid vehicle. If the traveling driving force output apparatus 90 includes only an engine, an engine ECU adjusts a degree of opening of a throttle of the engine, a shift stage, or the like according to information input from a traveling control unit 130, which will be described below, and outputs a traveling driving force (torque) for the vehicle to travel. Also, if the traveling driving force output apparatus 90 includes only a traveling motor, a motor ECU adjusts a duty ratio of a pulse width modulation (PWM) signal assigned to the traveling motor according to information input from the traveling control unit 130 and outputs the above-mentioned traveling driving force. Also, if the traveling driving force output apparatus 90 includes an engine and a traveling motor, both an engine ECU and a motor ECU control the traveling driving force in cooperation with each other according to information input from the traveling control unit 130.

The steering apparatus 92 includes, for example, an electric motor, a steering torque sensor, a steering angle sensor, etc. The electric motor changes, for example, a direction of a steering wheel by causing a force to act on a rack and pinion function or the like. The steering torque sensor detects, for example, torsion of a torsion bar when the steering wheel is operated as steering torque (a steering force). The steering angle sensor detects, for example, a steering angle (or an actual steering angle).

The steering apparatus 92 causes the electric motor to drive according to the information input from the traveling control unit 130 and changes the direction of the steering wheel.

The brake apparatus 94 includes a master cylinder which transmits a brake operation performed on a brake pedal as an oil pressure, a reservoir tank which stores brake fluid, a brake actuator which adjusts a braking force output to each vehicle wheel, or the like. The brake control unit 44 controls the brake actuator or the like so that a brake torque according to a pressure of the master cylinder is output to each vehicle wheel according to information input from the traveling control unit 130. Also, the brake apparatus 94 is not limited to an electronic control type brake apparatus which is operated by the above-described oil pressure, and may be an electronic control type brake apparatus which is operated by an electronic actuator.

The operation device 70 includes, for example, an accelerator pedal, a steering wheel, a brake pedal, a shift lever, etc. The operation detection sensor 72 which detects a presence, absence, or amount of operation by a driver is attached to the operation device 70. The operation detection sensor 72 includes, for example, an accelerator opening sensor, a steering torque sensor, a brake sensor, a shift position sensor, etc. The operation detection sensor 72 outputs a degree of accelerator opening, a steering torque, an amount of brake depression, a shifted position, etc. serving as detection results to the traveling control unit 130. Also, in place of this, a detection result of the operation detection sensor 72 may be directly output to the driving force output apparatus 90, the steering apparatus 92, or the brake apparatus 94.

The changeover switch 80 is a switch to be operated by the driver or the like. The changeover switch 80 may be, for example, a mechanical switch installed in the steering wheel, a trim (a dashboard), or the like or may be a graphical user interface (GUI) switch provided in a touch panel of the navigation apparatus 50. The changeover switch 80 receives an operation of the driver or the like, generates a control mode designation signal for designating a control mode by the traveling control unit 130 as one of an automatic drive mode and a manual drive mode, and outputs the control mode designation signal to a control switching unit 140. The automatic drive mode is a drive mode in which a vehicle travels in a state in which a driver does not perform an operation (or an amount of operation is less or an operation frequency is lower than in the manual drive mode) as mentioned above. More specifically, the automatic drive mode is a drive mode in which some or all of the traveling driving force output apparatus 90, the steering apparatus 92 and the brake apparatus 94 are controlled on the basis of an action plan.

[Vehicle Control Apparatus]

Hereinafter, the vehicle control apparatus 100 will be described. The vehicle control apparatus 100 includes, for example, an own-vehicle position recognition unit 102, an external world recognition unit 104, an action plan generation unit 106, a traveling state determination unit 110, a first trajectory generation unit 112, a lane change control unit 120, the traveling control unit 130, a storage control unit 132, the control switching unit 140, and the storage unit 150. Some or all of the own-vehicle position recognition unit 102, the external world recognition unit 104, the action plan generation unit 106, the traveling state determination unit 110, the first trajectory generation unit 112, the lane change control unit 120, the traveling control unit 130, the storage control unit 132, and the control switching unit 140 are software function units which function by a processor such as a central processing unit (CPU) executing a program. Also, some or all of the units may be hardware function units such as large scale integration (LSI) and an application specific integrated circuit (ASIC). Also, the storage unit 150 is implemented by a read-only memory (ROM), a random access memory (RAM), a hard disk drive (HDD), a flash memory, etc. A program to be executed by the processor may be pre-stored in the storage unit 150 and may be downloaded from an external apparatus via an on-vehicle Internet facility or the like. Also, a portable storage medium storing a program may be mounted in a drive apparatus (not illustrated) and installed in the storage unit 150.

The own-vehicle position recognition unit 102 recognizes a lane along which the own vehicle M travels (a traveling lane) and a relative position of the own vehicle M in regards to the traveling lane on the basis of information input from map information 152 stored in the storage unit 150, the finder 20, the radar 30, the camera 40, the navigation apparatus 50, or the vehicle sensor 60. The map information 152 is, for example, map information having more precision than a navigation map provided in the navigation apparatus 50 and may include information of a center of a lane or information about a boundary of a lane. More specifically, the map information 152 includes road information, traffic control information, address information (an address and a postal code), facility information, telephone number information, etc. The road information includes information indicating a type of road such as a highway, a toll road, a national road, or a prefectural road and information about the number of lanes of the road, a width of each road, a gradient of the road, a position (three-dimensional coordinates including longitude, latitude, and elevation) of the road, a curvature of a curve of a lane, positions of merging and branching points of the lane, a sign provided on the road, etc. The traffic control information includes information indicating that the lane is blocked due to construction, traffic accidents, traffic jams, or the like.

Figure 3:
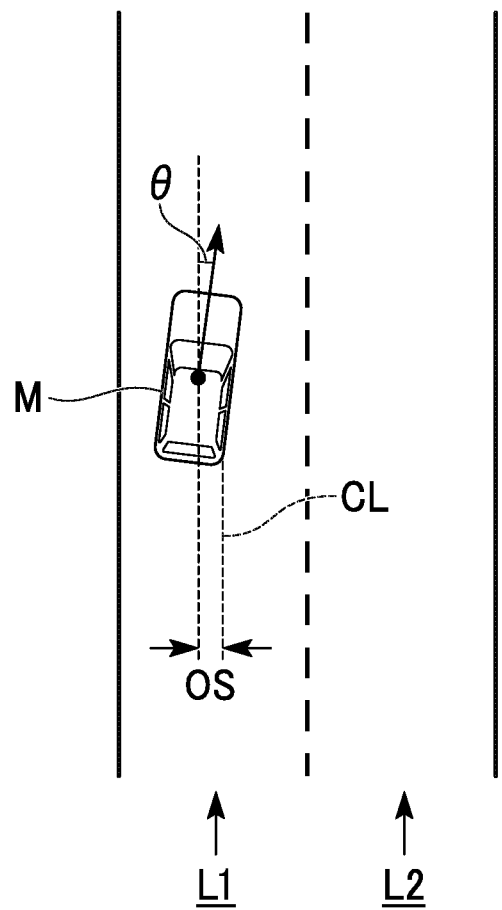
FIG. 3 is a diagram illustrating a state in which an own-vehicle position recognition unit 102 recognizes a relative position of the own vehicle M in regards to a traveling lane L1.

FIG. 3 is a diagram illustrating a state in which the own-vehicle position recognition unit 102 recognizes a relative position of the own vehicle M in regards to a traveling lane L1. The own-vehicle position recognition unit 102 recognizes, for example, a gap OS from a traveling lane center CL of a reference point (for example, a center of gravity) of the own vehicle M and an angle θ formed with respect to a line lined with the traveling lane center CL of a traveling direction of the own vehicle M as a relative position of the own vehicle M in regards to the traveling lane L1. Also, in place of this, the own-vehicle position recognition unit 102 may recognize a position of a reference point of the own vehicle M or the like for one side end of the own-vehicle lane L1 as the relative position of the own vehicle M in regards to the traveling lane.

The external world recognition unit 104 recognizes a position and states of a speed and acceleration of a peripheral vehicle on the basis of information input from the finder 20, the radar 30, the camera 40, etc. The peripheral vehicle in the present embodiment is a vehicle which travels in the same direction as the own vehicle M and is a vehicle which travels around the own vehicle M. The position of the peripheral vehicle may be indicated by a representative point such as a center of gravity or a corner of the other vehicle or indicated by an area in which an outline of the other vehicle is represented. The "state" of the peripheral vehicle may include whether the peripheral vehicle accelerates or makes a lane change (or whether a lane change is intended) on the basis of information of the above-mentioned various types of devices. Also, the external world recognition unit 104 may recognize positions of other physical objects such as a guardrail, a utility pole, a parked vehicle, and a pedestrian in addition to a peripheral vehicle.

The action plan generation unit 106 generates an action plan in a predetermined section. The predetermined section is, for example, a section in which the vehicle passes through a toll road such as a highway among routes derived by the navigation apparatus 50. Also, the action plan generation unit 106 is not limited thereto, but may generate an action plan for arbitrary section.

The action plan is constituted of, for example, a plurality of events which are sequentially executed. The events include, for example, a deceleration event for causing the own vehicle M to decelerate, an acceleration event for causing the own vehicle M to accelerate, a lane keeping event for causing the own vehicle M to travel without deviating from a traveling lane, a lane change event for changing traveling lanes, a passing event for causing the own vehicle M to pass a front traveling vehicle, a branching event for causing the own vehicle M to change its lane to a desired lane or causing the own vehicle M to travel without deviating from a current traveling lane at a branching point, a merging event for causing the own vehicle M to accelerate or decelerate or make a traveling lane change in a merging lane for joining a main lane, etc. For example, if a junction (a branching point) is on a toll road (for example, a highway or the like), it is necessary for the vehicle control apparatus 100 to change its lane or keep its lane so that the own vehicle M moves in a direction of a destination in the automatic drive mode. Accordingly, when the map information 152 is referred to and it is determined that a junction is on a road, the action plan generation unit 106 sets the lane change event for changing its lane to a desired lane along which the own vehicle M can move in the direction of the destination from a current position (coordinates) of the own vehicle M to a position (coordinates) of the junction. Also, information indicating the action plan generated by the action plan generation unit 106 is stored as action plan information 156 in the storage unit 150.

Figure 4:
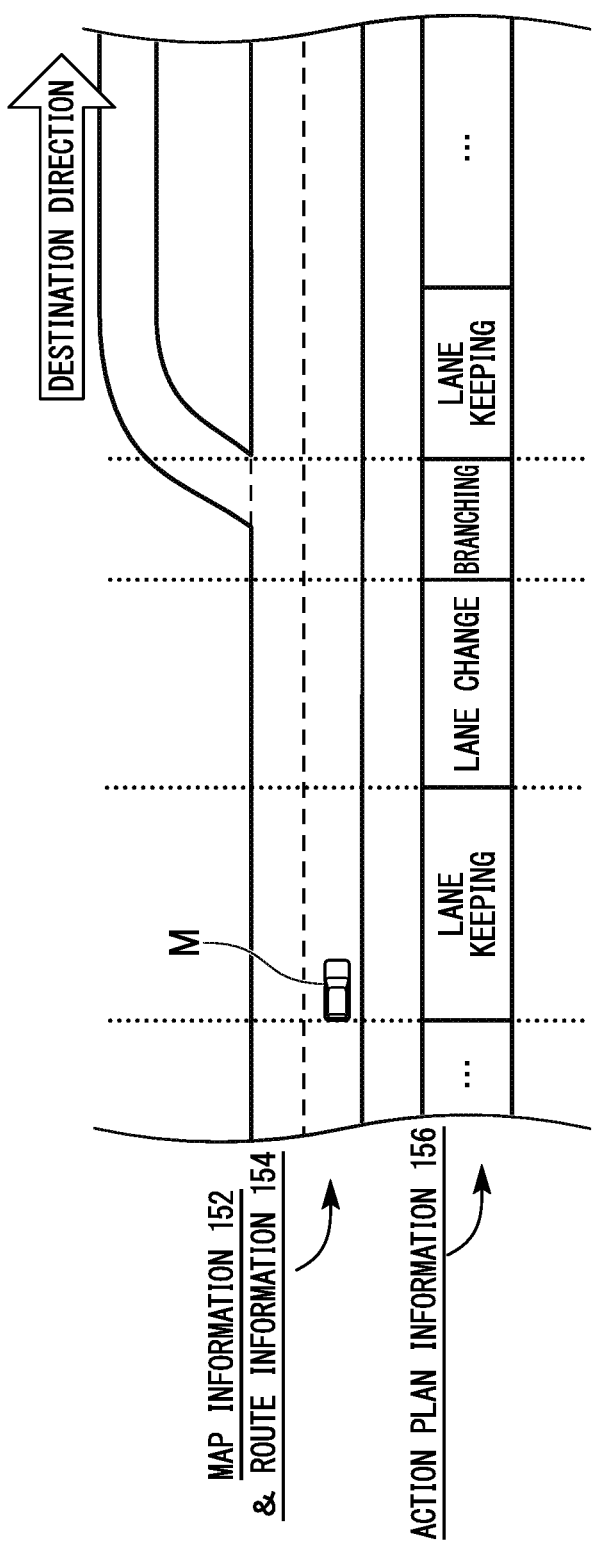
FIG. 4 is a diagram illustrating an example of an action plan generated in a certain section.

FIG. 4 is a diagram illustrating an example of an action plan generated in a certain section. As illustrated, the action plan generation unit 106 classifies a scene occurring in a case in which the own vehicle M has traveled along a route up to a destination and generates an action plan so that an event based on each scene is executed. Also, the action plan generation unit 106 may dynamically change the action plan according to a situation change of the own vehicle M.

The action plan generation unit 106 may change (update), for example, the generated action plan on the basis of a state of an external world recognized by the external world recognition unit 104. Generally, the state of the external world constantly changes while the vehicle travels. In particular, if the own vehicle M travels along a road including a plurality of lanes, a distance interval from another vehicle relatively changes. For example, if a preceding vehicle decelerates by performing abrupt braking or if a vehicle traveling along an adjacent lane cuts in front of the own vehicle M, the own vehicle M needs to travel while appropriately changing its speed or lanes according to the action of the preceding vehicle or the action of the vehicle of the adjacent lane. Accordingly, the action plan generation unit 106 may change an event set for each control section according to the above-mentioned state change of the external world.

Specifically, if the speed of another vehicle recognized by the external world recognition unit 104 has exceeded a threshold value while the own vehicle travels or if a movement direction of another vehicle traveling along a lane adjacent to the own-vehicle lane is an own-vehicle lane direction, the action plan generation unit 106 changes an event set in a section in which the own vehicle M is scheduled to travel. For example, if the event is set so that the lane change event is executed after the lane keeping event, the action plan generation unit 106 changes the next event after the lane keeping event from the lane change to the deceleration event, the lane keeping event, or the like when it is determined that the vehicle has traveled at speed greater than or equal to the threshold value from the rear of a lane change destination during the lane keeping event according to a recognition result of the external world recognition unit 104. Thereby, the vehicle control apparatus 100 avoids a collision of the own vehicle M with a vehicle of the lane change destination. As a result, the vehicle control apparatus 100 can cause the own vehicle M to automatically travel safely even if the state of the external world has changed.

[Lane Keeping Event]

When the lane keeping event included in the action plan is executed by the traveling control unit 130, the traveling state determination unit 110 determines a traveling state of one of constant speed traveling, follow-up traveling, deceleration traveling, cornering traveling, obstacle avoidance traveling, etc. For example, if no other vehicle travels in front of the own vehicle, the traveling state determination unit 110 determines the traveling state as the constant speed traveling. Also, if the own vehicle performs the follow-up traveling in regards to a front traveling vehicle, the traveling state determination unit 110 determines the traveling state as the follow-up traveling. Also, if the external world recognition unit 104 recognizes a deceleration of a front traveling vehicle or if an event such as stopping or parking is executed, the traveling state determination unit 110 determines the traveling state as the deceleration traveling. Also, if the external world recognition unit 104 has recognized that the own vehicle M is approaching a curved road, the traveling state determination unit 110 determines the traveling state as the cornering traveling. Also, if the external world recognition unit 104 has recognized that an obstacle is in front of the own vehicle M, the traveling state determination unit 110 determines the traveling state as the obstacle avoidance traveling.

The first trajectory generation unit 112 generates a trajectory on the basis of the traveling state determined by the traveling state determination unit 110. The trajectory is a set (a locus) of points at which a future target position at which it is assumed that the own vehicle M will arrive is sampled for every predetermined time if the own vehicle M travels on the basis of the traveling state determined by the traveling state determination unit 110.

Figure 5:
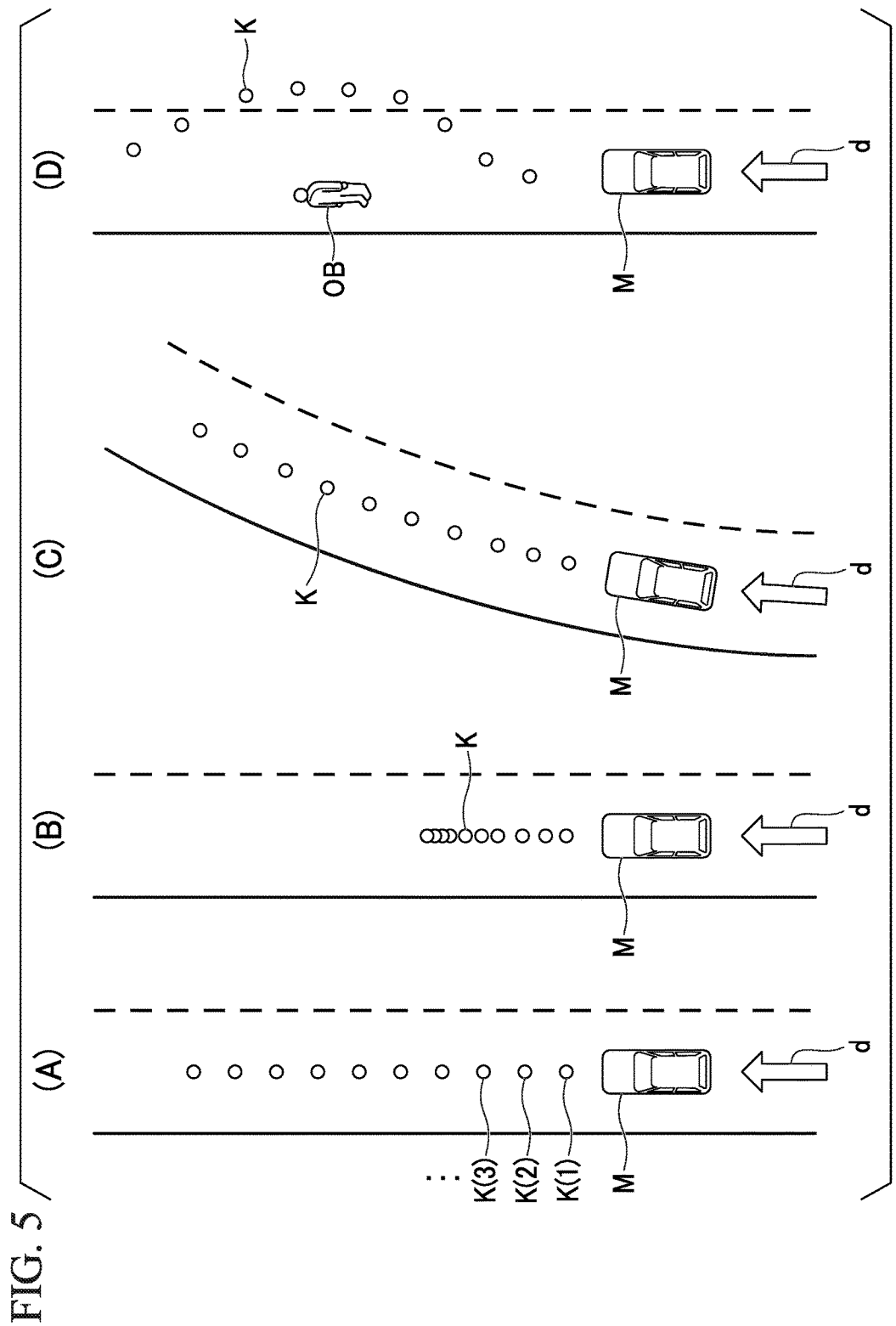
FIG. 5 is a diagram illustrating an example of a trajectory generated by a first trajectory generation unit 112.

FIG. 5 is a diagram illustrating an example of a trajectory generated by the first trajectory generation unit 112. As illustrated in (A) of FIG. 5, for example, the first trajectory generation unit 112 sets future target positions such as K(1), K(2), K(3), . . . as a trajectory of the own vehicle M every time a predetermined time Δt elapses from a current time on the basis of a current position of the own vehicle M. Hereinafter, these target positions are merely referred to as a "target position K" unless otherwise distinguished. For example, the number of target positions K is determined according to a target time T. For example, the first trajectory generation unit 112 sets the target position K on a center line of a traveling lane at an interval of the predetermined time Δt (for example, 0.1 sec) for 5 sec if the target time T is set to 5 sec, and determines arrangement intervals of a plurality of target positions K on the basis of the traveling state. The first trajectory generation unit 112 may derive, for example, the center line of the traveling lane from information such as a width of the lane included in the map information 152 and may acquire the center line of the traveling lane from the map information 152 if the center line of the traveling lane is previously included in the map information 152.

For example, if the above-mentioned traveling state determination unit 110 determines the traveling state as the constant speed traveling, the first trajectory generation unit 112 generates a trajectory by setting the plurality of target positions K at regular intervals as illustrated in (A) of FIG. 5. Also, if the traveling state determination unit 110 determines the traveling state as the deceleration traveling (a case in which a preceding vehicle has decelerated in the follow-up traveling is also included), the first trajectory generation unit 112 generates the trajectory by further widening an interval when an arrival time is earlier and further narrowing the interval when the arrival time is later as illustrated in (B) of FIG. 5. Thereby, the traveling control unit 130, which will be described below, causes the own vehicle M to decelerate because the target position K at which an arrival time from the own vehicle M is late is close to the current position of the own vehicle M.

Also, as illustrated in (C) of FIG. 5, the traveling state determination unit 110 determines the traveling state as the cornering traveling when a road is a curved road. In this case, the first trajectory generation unit 112 generates a trajectory by arranging the plurality of target positions K while changing a horizontal position in a traveling direction of the own vehicle M (a position of a lane width direction), for example, according to a curvature of the road. Also, as illustrated in (D) of FIG. 5, if an obstacle OB such as a human or a stopped vehicle is on a road in front of the own vehicle M, the traveling state determination unit 110 determines the traveling state as the obstacle avoidance traveling.

In this case, the first trajectory generation unit 112 generates a trajectory by arranging the plurality of target positions K so that the own vehicle M travels while avoiding the obstacle OB.

[Lane Change Event]

The lane change control unit 120 performs control when the traveling control unit 130 executes the lane change event included in the action plan. The lane change control unit 120 includes, for example, a target position setting unit 122, a lane change possibility determination unit 124, and a second trajectory generation unit 126. Also, the lane change control unit 120 may perform the following process when the traveling control unit 130 performs the branching event or the merging event.

The target position setting unit 122 specifies a vehicle which travels along a lane adjacent to a lane (an own-vehicle lane) along which the own vehicle M travels and which travels in front of the own vehicle M and a vehicle which travels along the adjacent lane and which travels behind the own vehicle M and sets a target area TA between the vehicles. Hereinafter, the vehicle which travels along the adjacent lane and which travels in front of the own vehicle M will be described by being referred to as a front reference vehicle and the vehicle which travels along the adjacent lane and which travels behind the own vehicle M will be described by being referred to as a rear reference vehicle. Also, the target position setting unit 122 may set the target area TA behind a rear reference vehicle mC (between the rear reference vehicle mC and a vehicle located behind the rear reference vehicle mC) on an adjacent lane L2.

If a predetermined setting condition that no peripheral vehicle is in the target area TA set by the target position setting unit 122 and both a virtual time-to collision (TTC) between the own vehicle M and the front reference vehicle and a virtual TTC between the own vehicle M and the rear reference vehicle are greater than a threshold value is satisfied, the lane change possibility determination unit 124 determines that the own vehicle M can change its lane into the target area TA set on the adjacent lane. The TTC is derived by, for example, assuming that the own vehicle M has changed the lane to the target area TA and dividing an inter-vehicle distance between the virtual own vehicle M in the target area TA and the front reference vehicle (or the rear reference vehicle) by a speed of the own vehicle M and a relative speed of the front reference vehicle (or the rear reference vehicle).

Figure 6:
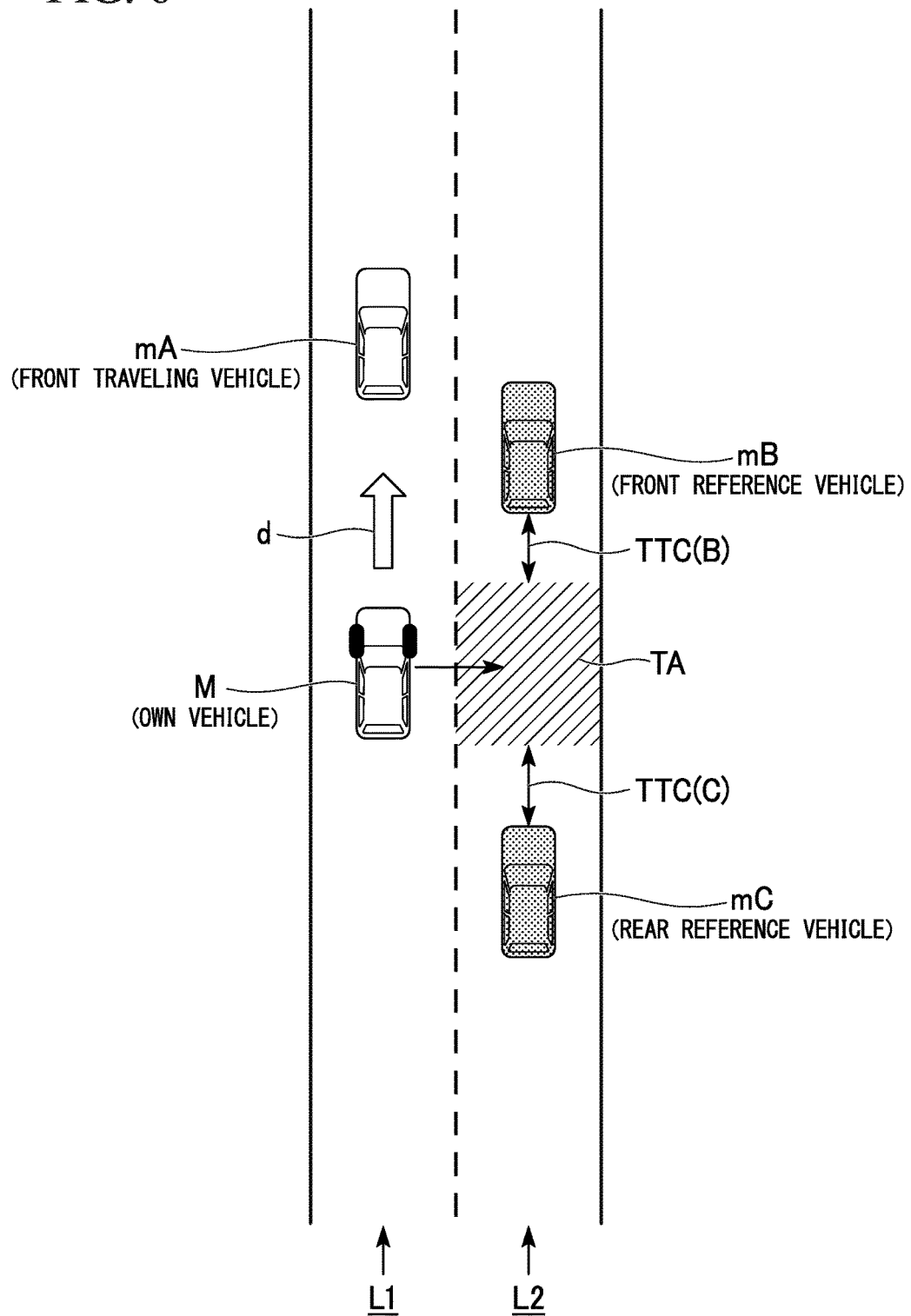
FIG. 6 is a diagram illustrating a state in which a target position setting unit 122 sets a target area TA in the first embodiment.

FIG. 6 is a diagram illustrating a state in which the target position setting unit 122 sets the target area TA in the first embodiment. In FIG. 6, mA denotes a front traveling vehicle, mB denotes a front reference vehicle, and mC denotes a rear reference vehicle. Also, an arrow d denotes a traveling direction of the own vehicle, L1 denotes an own-vehicle lane, and L2 denotes an adjacent lane.

In the case of the example of FIG. 6, the target position setting unit 122 sets the target area TA between a front reference vehicle mB and the front reference vehicle mC on the adjacent lane L2. In this case, the lane change possibility determination unit 124 virtually arranges the own vehicle M in the target area TA set by the target position setting unit 122 and derives a TTC (B) for the front reference vehicle mB and a TTC (C) for the rear reference vehicle mC on the basis of the virtual own vehicle M. The lane change possibility determination unit 124 determines whether both of the two derived TTCs satisfy a predetermined setting condition and determines that the own vehicle M can change its lane into the target area TA set on the adjacent lane L2 if both the TTCs satisfy the predetermined setting condition (for example, if the TTCs are greater than or equal to threshold values set in a front direction and the rear direction).

Also, the lane change possibility determination unit 124 may determine whether the own vehicle M can change its lane into the target area TA in consideration of speeds, accelerations, or jerks of a front traveling vehicle mA, the front reference vehicle mB, and the rear reference vehicle mC. For example, if the speeds of the front reference vehicle mB and the rear reference vehicle mC are greater than the speed of the front traveling vehicle mA and the front reference vehicle mB and the rear reference vehicle mC are expected to pass the front traveling vehicle mA within a range of time required for the own vehicle M to change the lanes, the lane change possibility determination unit 124 determines that the own vehicle M cannot change its lane into the target area TA set between the front reference vehicle mB and the rear reference vehicle mC.

If the above-mentioned lane change possibility determination unit 124 has determined that the own vehicle M can change its lane into the target area TA, the second trajectory generation unit 126 generates a trajectory for changing the lane into the target area TA.

Figure 7:
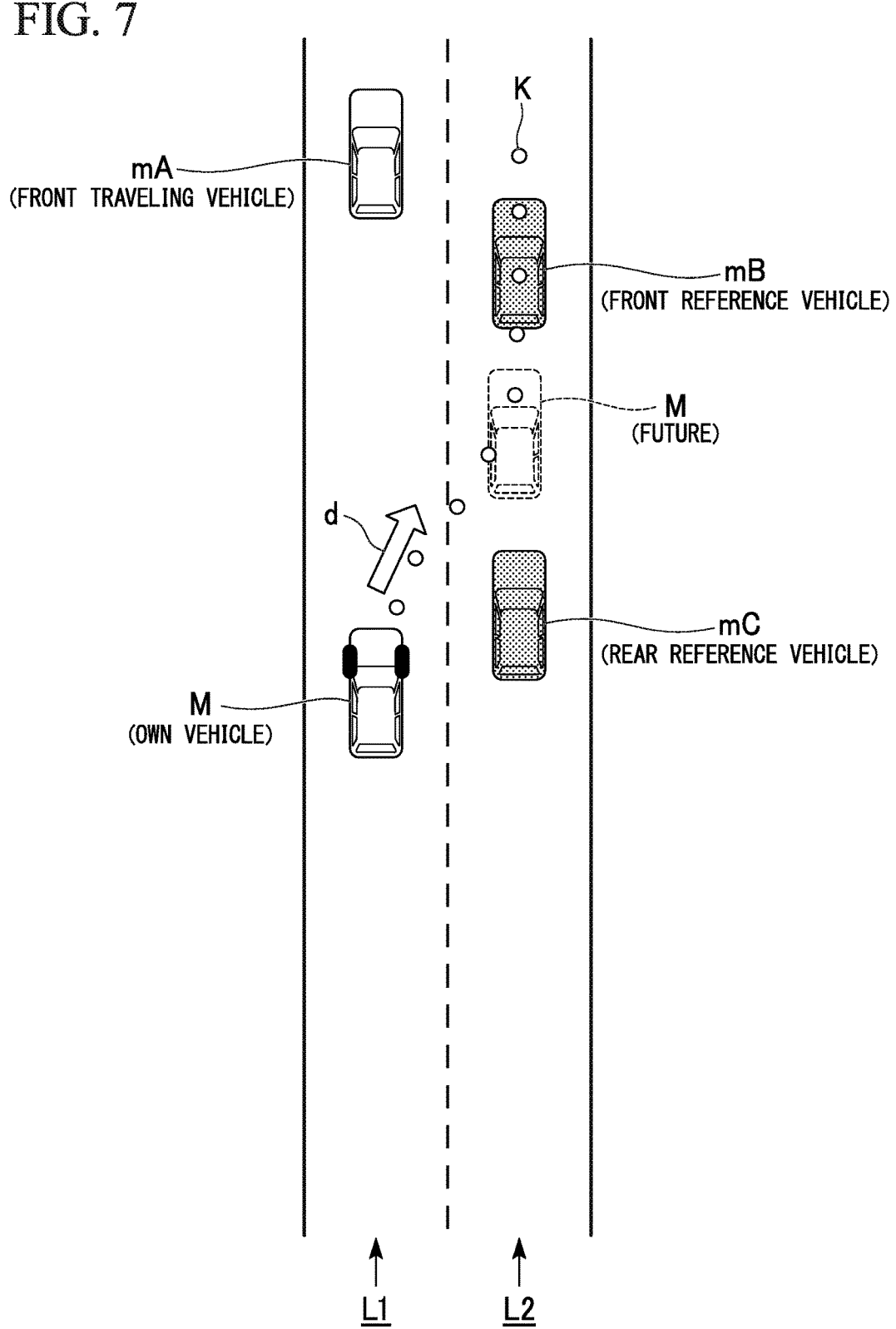
FIG. 7 is a diagram illustrating a state in which a second trajectory generation unit 126 generates a trajectory in the first embodiment.

FIG. 7 is a diagram illustrating a state in which the second trajectory generation unit 126 generates a trajectory in the first embodiment. For example, the second trajectory generation unit 126 assumes that the front reference vehicle mB and the rear reference vehicle mC travel in predetermined speed models and generates a trajectory so that the own vehicle M is between the front reference vehicle mB and the rear reference vehicle mC at a certain time in the future on the basis of speed models of the three vehicles and a speed of the own vehicle M. For example, the second trajectory generation unit 126 smoothly connects positions from a current position of the own vehicle M to a position of the front reference vehicle mB at a certain time in the future using a polynomial curve such as a spline curve and arranges a predetermined number of target positions K at regular intervals or irregular intervals on the curve. At this time, the second trajectory generation unit 126 generates a trajectory so that at least one of the target positions K is arranged in the target area TA.

Figure 8:
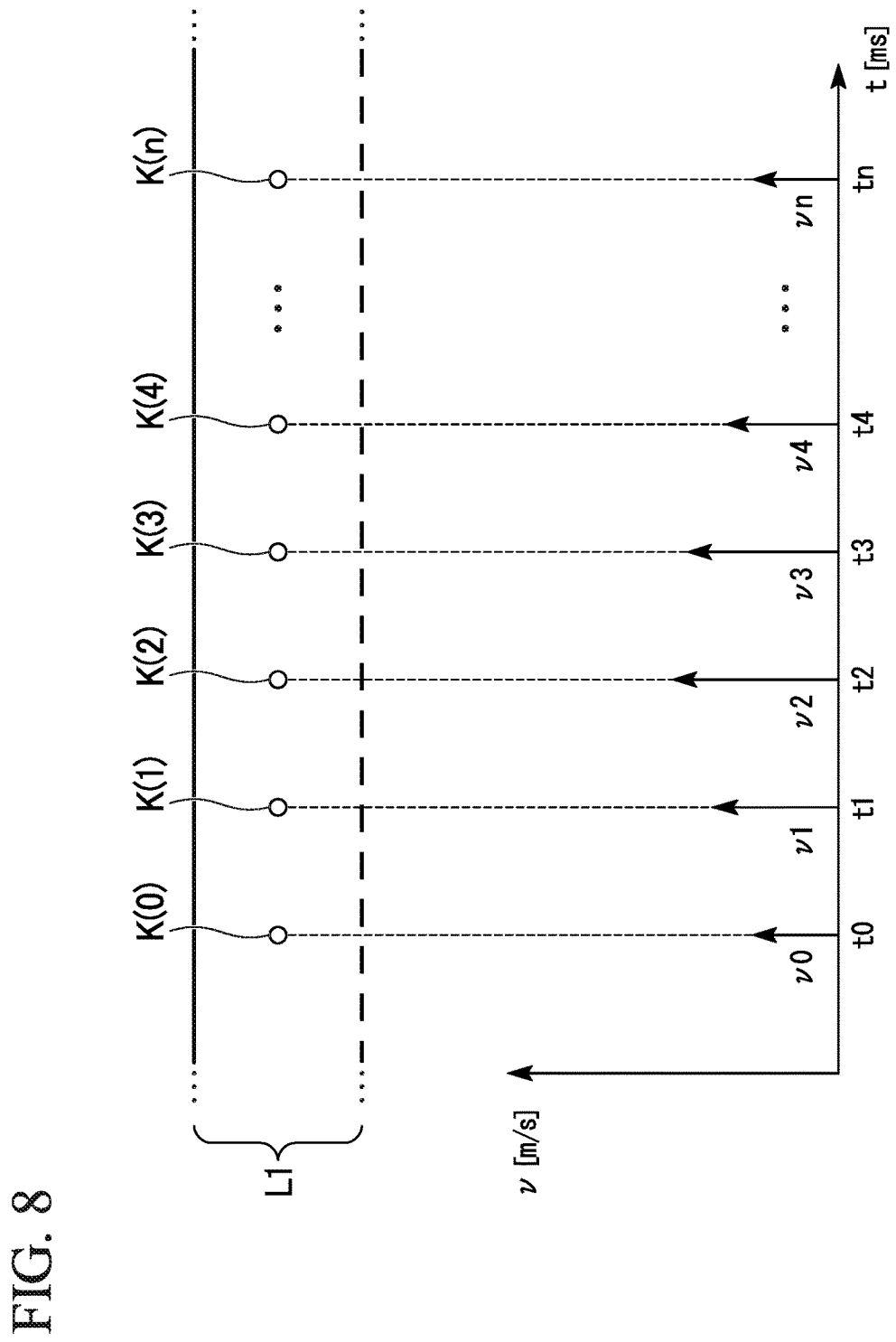
FIG. 8 is a diagram illustrating an example of a target speed v set for each target position K on a trajectory generated by the first trajectory generation unit 112 or the second trajectory generation unit 126.

FIG. 8 is a diagram illustrating an example of a target speed v set for each target position K on the trajectory generated by the first trajectory generation unit 112 or the second trajectory generation unit 126. As illustrated, the target speed v is automatically determined on the basis of each target position K on the trajectory, an arrangement interval (the predetermined time Δt), and a target time T. For example, the target speed v is determined for each target position K so that a target speed v0 is set at a target position K(0), a target speed v1 is set at the target position K(1), and a target speed v2 is set at the target position K(2).

[Travel Control]

The traveling control unit 130 sets the control mode to the automatic drive mode or the manual drive mode according to control by the control switching unit 140 and controls a control target including some or all of the traveling driving force output apparatus 90, the steering apparatus 92, and the brake apparatus 94 according to the set control mode. The traveling control unit 130 reads the action plan information 156 generated by the action plan generation unit 106 during the automatic drive mode and controls the control target on the basis of an event included in the read action plan information 156.

For example, the traveling control unit 130 determines an amount of control of the electric motor in the steering apparatus 92 (for example, the number of revolutions) and an amount of control of the ECU in the traveling driving force output apparatus 90 (for example, a degree of opening of a throttle of the engine, a shift stage, or the like) according to the trajectory generated by the first trajectory generation unit 112 or the second trajectory generation unit 126. Specifically, the traveling control unit 130 determines the amount of control of the ECU in the traveling driving force output apparatus 90 according to the target speed v (or acceleration or jerk) for each predetermined time Δt calculated from the target position K of the trajectory. Also, the traveling control unit 130 determines the amount of control of the electric motor in the steering apparatus 92 according to an angle formed by a traveling direction of the own vehicle M for each target-position K and a direction of a subsequent target position based on the target position.

Figure 9:
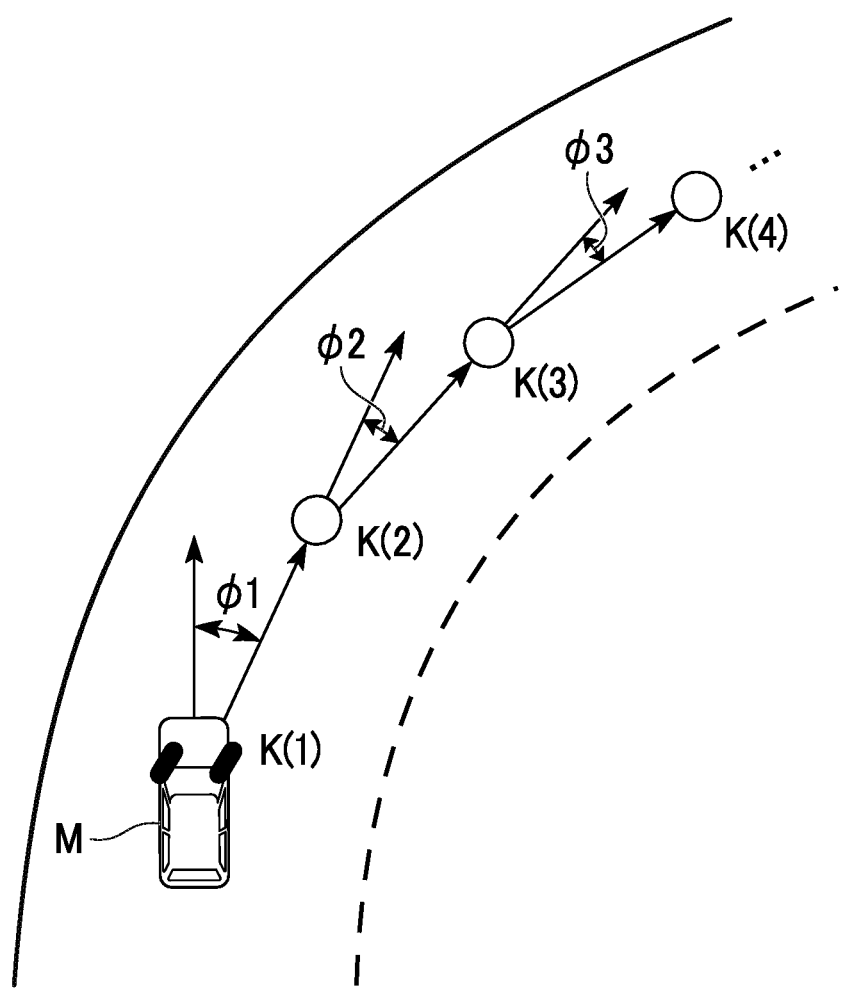
FIG. 9 is a diagram illustrating an example of a scene in which a traveling control unit 130 determines an amount of control of a steering apparatus 92.

FIG. 9 is a diagram illustrating an example of a scene in which the traveling control unit 130 determines an amount of control of the steering apparatus 92. At a target position K(i) on the trajectory generated by the first trajectory generation unit 112 or the second trajectory generation unit 126, a deflection angle ϕi which is for the own vehicle M to travel in a direction in which a next scheduled target position K(i+1) at which the own vehicle M will arrive is present after the target position K(i) is included. If the deflection angle ϕi is based on, for example, the target position K(i), the deflection angle ϕi is an angle formed by an axial direction of the own vehicle M at the target position K(i) and a direction in which the next scheduled arrival target position K(i+1) is present.

The trajectory generated as described above includes a steering component of the vehicle in addition to a speed component described with reference to FIG. 8. The steering component is a steering angle for implementing a component of the deflection angle ϕi included in the trajectory. The deflection angle ϕi is determined on the basis of a wheel base of the own vehicle M, a tread spacing, vehicle behavior including speed, or the like in addition to the steering angle. Accordingly, the traveling control unit 130 determines the steering angle on the basis of, for example, information about the deflection angle ϕi corresponding to each target position K(i), a vehicle speed (or acceleration or jerk) acquired from the vehicle sensor 60, the angular speed (a yaw rate) around the vertical axis, or the like and determines an amount of control of the electric motor in the steering apparatus 92 so that a displacement for the steering angle is assigned to a wheel.

In the example of FIG. 9, the own vehicle M is located at the target position K(1) and travels on a trajectory generated along a curved road. In this case, the traveling control unit 130 determines, for example, an amount of control of the electric motor in the steering apparatus 92 so that a vehicle wheel is in a right direction in FIG. 9, on the basis of the deflection angle ϕ1 which is an angle formed by a traveling direction of the own vehicle M of the target position K(1) and a direction of a next scheduled arrival target position K(2). The traveling control unit 130 iteratively performs the above-mentioned process at target positions K(2), K(3), . . . and causes the own vehicle M to travel along the curved road.

The traveling control unit 130 outputs information indicating the amount of control to a corresponding control target. Thereby, each of the apparatuses 90, 92, and 94 of control targets can control its own apparatus according to the information indicating the amount of control input from the traveling control unit 130. Also, the traveling control unit 130 appropriately adjusts the determined amount of control on the basis of a detection result of the vehicle sensor 60.

When the own vehicle M is stopped, the storage control unit 132 causes the storage unit 150 to store information indicating the steering component (or a deflection angle ϕ) of the trajectory previously generated by the first trajectory generation unit 112 or the second trajectory generation unit 126 as steering angle information 158. For example, the storage control unit 132 causes the storage unit 150 to store a steering component corresponding to the target position K at which the own vehicle M is currently located or a last target position K at which the own vehicle M was previously located as the steering angle information 158.

Figure 10:
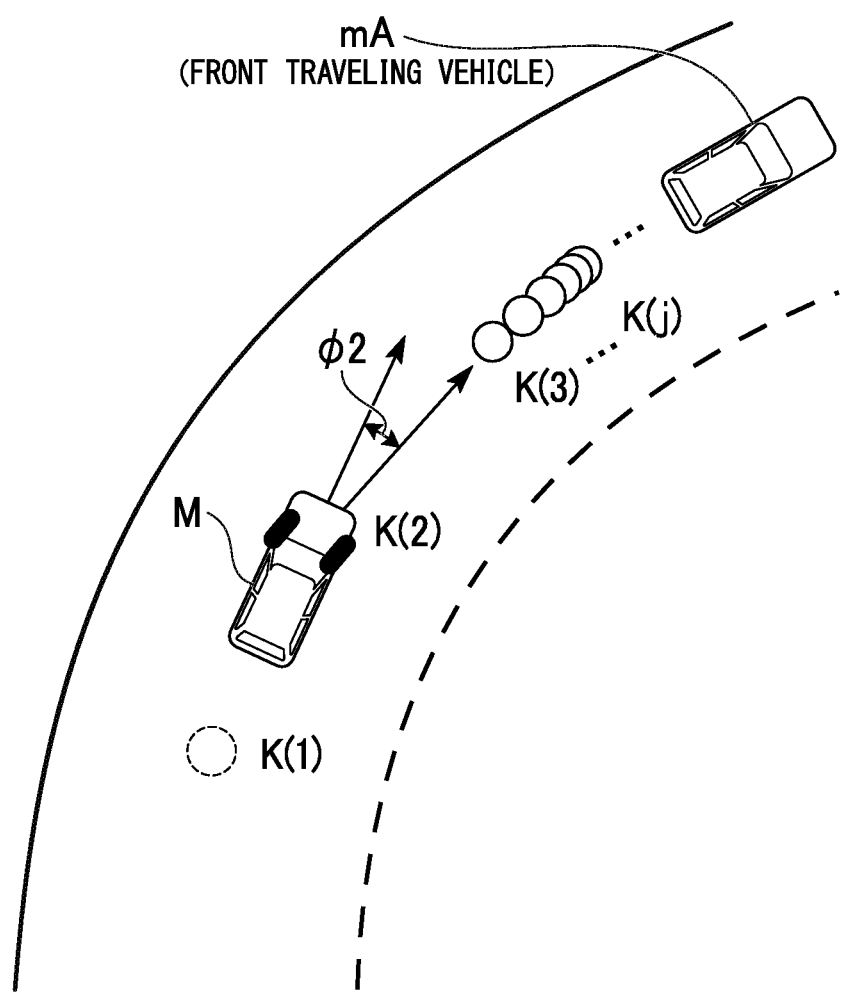
FIG. 10 is a diagram illustrating an example of a scene in which the own vehicle M illustrated in FIG. 9 has traveled for a predetermined time Δt.

FIG. 10 is a diagram illustrating an example of a scene in which the own vehicle M illustrated in the above-mentioned FIG. 9 has traveled for the predetermined time Δt. In the illustrated example, a situation in which the own vehicle M passing through the target position K(1) is located at the target position K(2) after the passage of the predetermined time Δt and the external world recognition unit 104 recognizes the front traveling vehicle mA stopped in front of the own vehicle M is shown. In this traveling situation, the traveling state determination unit 110 determines the traveling state of the own vehicle M as the deceleration traveling so that the own vehicle M is stopped near the position of the front traveling vehicle mA. In response to this, the first trajectory generation unit 112 generates a trajectory by further widening an interval when an arrival time is earlier for the target position K and further narrowing an interval when the arrival time is later for the target position K on the basis of a next scheduled arrival target position K(3) with respect to the target position K(2) at which the own vehicle M is currently located. For example, the first trajectory generation unit 112 generates the trajectory so that the own vehicle M is stopped in a section of target positions K(3) to K(j). Also, the second trajectory generation unit 126 may perform a similar process.

At this time, the storage control unit 132 causes the storage unit 150 to store information indicating a steering component (or a deflection angle ϕ2) corresponding to the target position K(2) at which the own vehicle M is currently located (for example, a steering angle) as the steering angle information 158. The traveling control unit 130 causes the own vehicle M to stop while causing an output of a driving force in the traveling driving force output apparatus 90 to be reduced in the section of the target positions K(3) to K(j) on the trajectory generated by the first trajectory generation unit 112 or the second trajectory generation unit 126. At this time, the steering component is removed from the trajectory for the own vehicle M to stop and a trajectory for the own vehicle M to be linearly stopped is provided.

However, the traveling control unit 130 causes the own vehicle M to stop while maintaining the current steering angle on the basis of the steering angle information 158 stored in the storage unit 150 in the section of the target positions K(3) to K(j) and maintains the steering angle when the own vehicle M has been stopped in a stopped period. Thereby, the vehicle control apparatus 100 can cause the own vehicle M to smoothly travel in a desired direction at a subsequent traveling start time.

Figure 11:
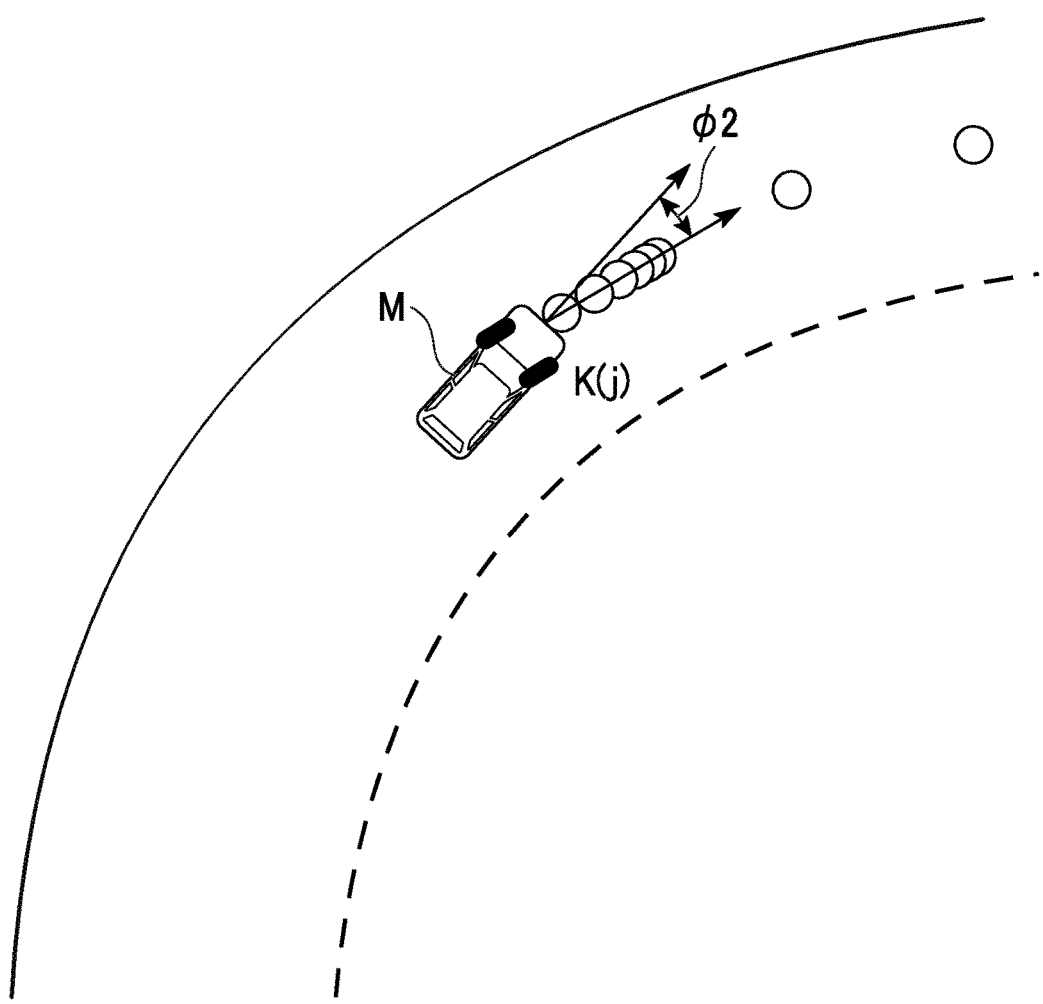
FIG. 11 is a diagram illustrating an example of a scene in which the own vehicle M which has been stopped in FIG. 10 starts to travel.

FIG. 11 is a diagram illustrating an example of a scene in which the own vehicle M which has been stopped in the above-mentioned FIG. 10 starts to travel. For example, if the external world recognition unit 104 does not recognize the front traveling vehicle mA stopped in front of the own vehicle M after the own vehicle M is stopped at the target position K(j), the traveling state determination unit 110 may determine the traveling state of the own vehicle M as the constant speed traveling. Also, if the external world recognition unit 104 recognizes that the front traveling vehicle mA stopped in front of the own vehicle M has started to travel, the traveling state determination unit 110 may determine the traveling state of the own vehicle M as the follow-up traveling so that the own vehicle M follows the front traveling vehicle mA which is starting to travel. In response to this, the first trajectory generation unit 112 or the second trajectory generation unit 126 generates a trajectory for causing the own vehicle M to accelerate.

The traveling control unit 130 causes the own vehicle M to accelerate while increasing the driving force of the traveling driving force output apparatus 90 on a trajectory which causes the own vehicle M to accelerate. At this time, the traveling control unit 130 can cause the own vehicle M to travel at a maintained steering angle after the start of traveling because the steering angle is maintained in a stopped period on the basis of the steering angle information 158 before the stop. Thereby, the vehicle control apparatus 100 can cause the own vehicle M to smoothly travel in a desired direction, i.e., a direction of a steering angle determined before the stop, at the traveling start time. Also, if the external world situation is significantly changed such as an emergency vehicle passing through an adjacent lane or the like, the vehicle control apparatus 100 may create a new trajectory. In this case, the traveling control unit 130 controls the steering angle on the basis of the new trajectory.

Figure 12:
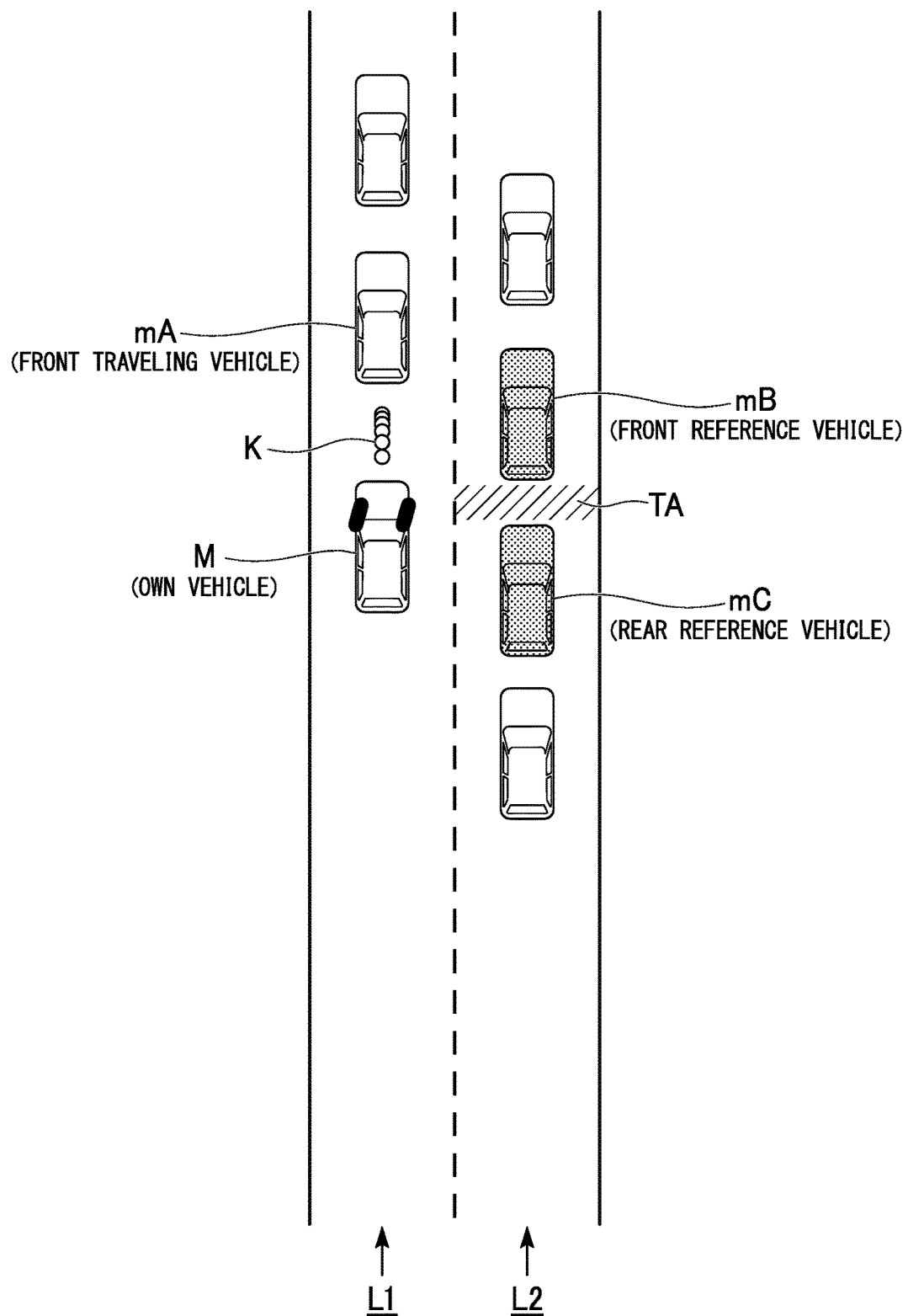
FIG. 12 is a diagram illustrating another scene in which the own vehicle M changes lanes.

FIG. 12 is a diagram illustrating another scene in which the own vehicle M changes lanes. The scene of FIG. 12 is a scene in which a traffic jam occurs in the adjacent lane L2 immediately after the scene illustrated in the above-mentioned FIG. 7 and the own vehicle M is stopped. Even in this scene, the vehicle control apparatus 100 can cause the own vehicle M to stop while maintaining the current steering angle and cause the own vehicle M to smoothly travel in the desired direction, i.e., the direction of the steering angle determined before the stop, at the traveling start time by maintaining the steering angle when the own vehicle M has been stopped in a stopped period. For example, by causing the own vehicle M to generate a steering angle before stopping and to stop, there is no steering wheel operation before the start of the own vehicle M from a stopped state. Accordingly, the vehicle control apparatus 100 can reduce a load on a steering system including power steering because a steering of a steering wheel of a stop time is absent.

Also, if the steering angle of the lane change is maintained in a stopped state, the vehicle control apparatus 100 may continuously transmit an own vehicle route according to a notification from a peripheral vehicle or the like by a turn signal, vehicle-to-vehicle communication, or the like.

Also, in a vehicle using a steering-by-wire or the like, the steering wheel may be operated so that the vehicle goes straight when the vehicle is in a linear state and the steering and the tire may be integrally related in consideration of an override possibility even in a state in which the steering angle is maintained using an actual tire.

As an override prediction, the vehicle control apparatus 100 predicts an override by detecting a line of sight, eye opening, a face direction, or the like of the driver. Before the override, the vehicle control apparatus 100 integrates a steering wheel operation and a steering angle. Also, in this case, a tire may be adjusted in a state in which the steering wheel is maintained and/or vice versa.

Figure 13:
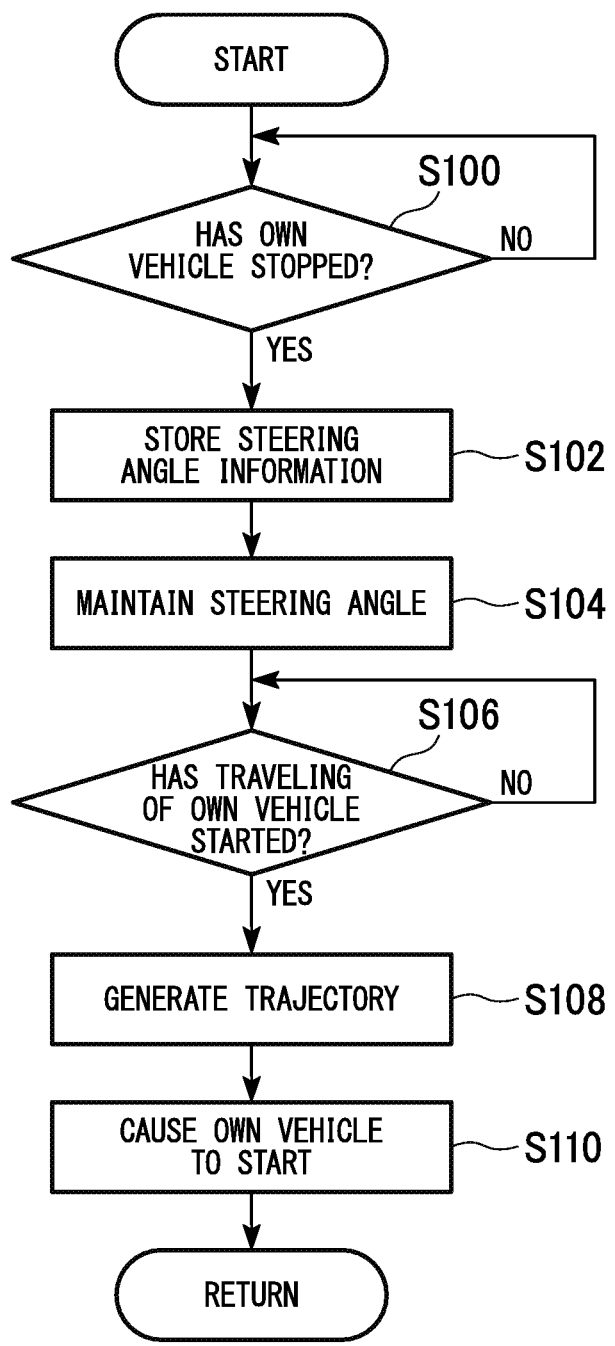
FIG. 13 is a flowchart illustrating an example of a flow of a process of the vehicle control apparatus 100 in the first embodiment.

FIG. 13 is a flowchart illustrating an example of a flow of a process of the vehicle control apparatus 100 in the first embodiment. The process of the flowchart is performed in a state in which the action plan generation unit 106 has generated an action plan, and is iteratively performed in a predetermined cycle.

First, the traveling state determination unit 110 determines whether to stop the own vehicle M on the basis of a recognition result of the external world recognition unit 104 (step S100). For example, the traveling state determination unit 110 determines to stop the own vehicle M if the external world recognition unit 104 recognizes that a front traveling vehicle is stopped or decelerates or if the external world recognition unit 104 recognizes that a pedestrian or the like is in front of the own vehicle M in a state in which the traveling state such as the constant speed traveling, the follow-up traveling, or the cornering traveling is determined.

When stopping the own vehicle M, the storage control unit 132 causes the storage unit 150 to store information indicating a steering component (or the deflection angle φ) corresponding to the target position K at which the own vehicle M is currently located or the last target position K at which the own vehicle M was previously located as the steering angle information 158 (step S102). At this time, the storage control unit 132 may cause the storage unit 150 to store the steering component corresponding to a trajectory at a time point when the own vehicle M is determined to be stopped, or may cause the storage unit 150 to store a steering component corresponding to a trajectory generated at a predetermined time before the time point when the own vehicle M is determined to be stopped.

Next, the traveling control unit 130 determines an amount of control of the electric motor in the steering apparatus 92 on the basis of the steering component (the deflection angle φ) included in the steering angle information 158 stored in the storage unit 150 and controls the steering apparatus 92 (step S104). Thus, the traveling control unit 130 controls the steering apparatus 92 to maintain a steering angle before the change of the trajectory before the own vehicle M is stopped and causes the steering angle to be maintained during the stop.

Next, the traveling state determination unit 110 determines whether to start traveling the own vehicle M on the basis of a recognition result of the external world recognition unit 104 (step S106). For example, if the external world recognition unit 104 recognizes that the front traveling vehicle is stopped in the above-mentioned step S100, the traveling state determination unit 110 determines to start the traveling of the own vehicle M if the external world recognition unit 104 recognizes that the traveling of the stopped front traveling vehicle has been started.

If the traveling of the own vehicle M is started, the first trajectory generation unit 112 or the second trajectory generation unit 126 generates a trajectory for acceleration and constant speed traveling (step S108). Next, the traveling control unit 130 causes the own vehicle M to start to travel on the basis of the target speed v set for each target position K on the trajectory generated by the first trajectory generation unit 112 or the second trajectory generation unit 126 in a state of the steering angle maintained in the above-mentioned step S104 (step S110). Thereby, the process of the flowchart ends.

Also, the traveling control unit 130 controls a control target on the basis of an operation detection signal output by the operation detection sensor 72 during the manual drive mode. For example, the traveling control unit 130 outputs the operation detection signal output by the operation detection sensor 72 to each apparatus of the control target as it is.

The control switching unit 140 switches the control mode of the own vehicle M by the traveling control unit 130 from the automatic drive mode to the manual drive mode or from the manual drive mode to the automatic drive mode on the basis of the action plan information 156 generated by the action plan generation unit 106 and stored in the storage unit 150. Also, the control switching unit 140 switches the control mode of the own vehicle M by the traveling control unit 130 from the automatic drive mode to the manual drive mode or from the manual drive mode to the automatic drive mode on the basis of a control mode designation signal input from the changeover switch 80. That is, the control mode of the traveling control unit 130 can arbitrarily change during traveling or during stop according to an operation of the driver or the like.

Also, the control switching unit 140 switches the control mode of the own vehicle M by the traveling control unit 130 from the automatic drive mode to the manual drive mode on the basis of the operation detection signal input from the operation detection sensor 72. For example, if an amount of operation included in the operation detection signal exceeds a threshold value, i.e., if the operation device 70 has received an operation in an amount of operation exceeding the threshold value, the control switching unit 140 switches the control mode of the traveling control unit 130 from the automatic drive mode to the manual drive mode. For example, if the traveling control unit 130 set to the automatic drive mode causes the own vehicle M to automatically travel, the control switching unit 140 switches the control mode of the traveling control unit 130 from the automatic drive mode to the manual drive mode if the driver operates the steering wheel, the accelerator pedal, or the brake pedal by an amount of operation exceeding the threshold value. Thereby, the vehicle control apparatus 100 can immediately switch the mode to the manual drive mode without any operation of the changeover switch 80 according to an instant operation performed by the driver when a physical object such as a human rushes out onto a roadway or a front traveling vehicle is abruptly stopped. As a result, the vehicle control apparatus 100 can cope with an emergency operation by the driver and improve safety during traveling.

According to the above-described first embodiment, the vehicle control apparatus 100 includes the first trajectory generation unit 112 or the second trajectory generation unit 126 configured to generate a locus of a position of the own vehicle M for each predetermined time in the future as a trajectory of the own vehicle M; the traveling control unit 130 configured to control traveling of the own vehicle M on the basis of the trajectory generated by the first trajectory generation unit 112 or the second trajectory generation unit 126; and the storage control unit 132 configured to cause the storage unit 150 to store information indicating a steering component of a trajectory previously generated by the first trajectory generation unit 112 or the second trajectory generation unit 126 when the own vehicle M is stopped, thereby causing the own vehicle M to smoothly travel in a desired direction, i.e., a direction of a steering angle determined before the stop, at a traveling start time.

Second Embodiment

Hereinafter, the second embodiment will be described. The vehicle control apparatus 100 in the second embodiment is different from that of the first embodiment in that a steering angle is determined with reference to the steering angle information 158 stored in the storage unit 150 when the own vehicle M starts to travel. Hereinafter, the related difference will be mainly described.

If the own vehicle M starts to travel, the traveling control unit 130 in the second embodiment re-determines the steering angle on the basis of a steering component (the deflection angle φ) included in the steering angle information 158 stored in the storage unit 150 and causes the own vehicle M to start after controlling (or while controlling) the steering apparatus 92 so that the displacement in regards to a steering angle is assigned to the wheel.

Figure 14:
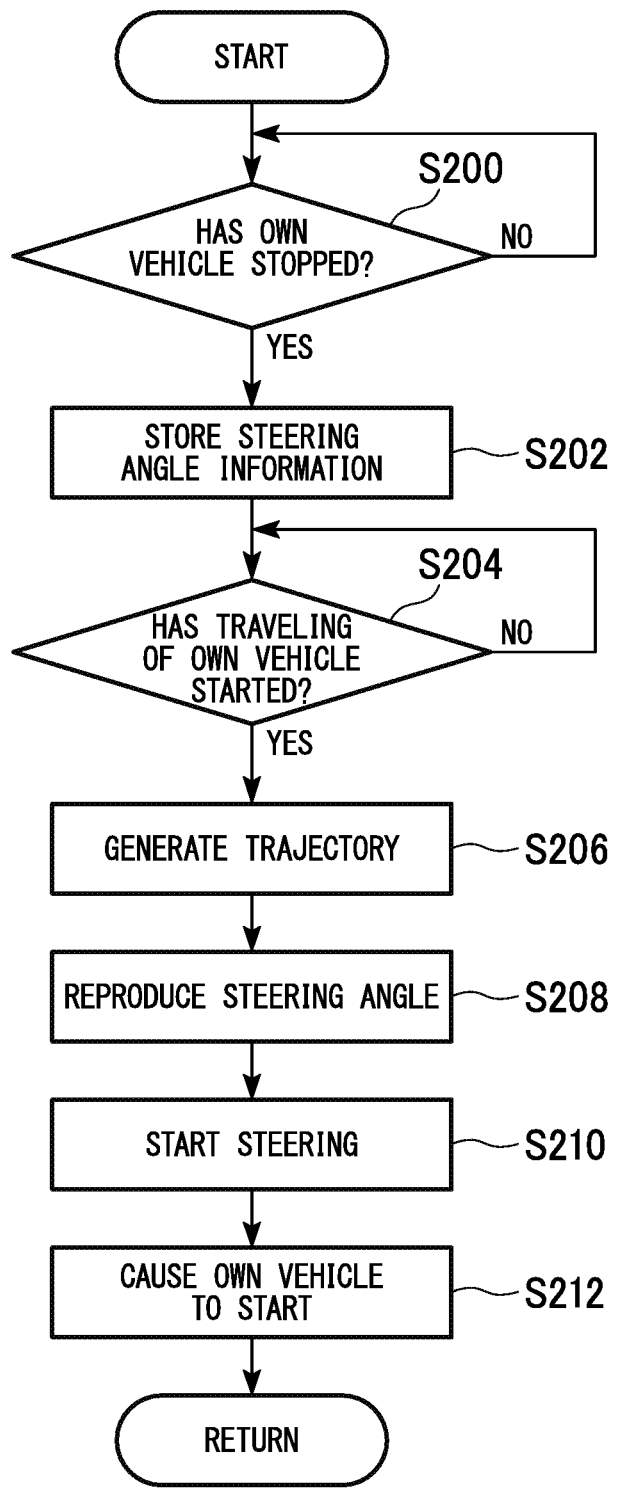
FIG. 14 is a flowchart illustrating an example of a flow of a process of the vehicle control apparatus 100 in a second embodiment.

FIG. 14 is a flowchart illustrating an example of a flow of a process of the vehicle control apparatus 100 in the second embodiment. The process of the flowchart is performed in a state in which the action plan generation unit 106 has generated an action plan and is iteratively performed in a predetermined cycle.

First, the traveling state determination unit 110 determines whether to stop the own vehicle M on the basis of a recognition result of the external world recognition unit 104 (step S200). If the own vehicle M is determined to be stopped, the storage control unit 132 causes the storage unit 150 to store information indicating a steering component (the deflection angle φ) corresponding to the target position K at which the own vehicle M is currently located or the last target position K at which the own vehicle M was previously located as the steering angle information 158 (step S202). At this time, the steering angle is intentionally maintained in the first embodiment, but the steering angle may be arbitrarily determined on the basis of a trajectory in the second embodiment.

Next, the traveling state determination unit 110 determines whether to start traveling the own vehicle M on the basis of a recognition result of the external world recognition unit 104 (step S204). If the traveling of the own vehicle M is started, the first trajectory generation unit 112 or the second trajectory generation unit 126 generates a trajectory for acceleration and constant speed traveling (step S206). Next, the traveling control unit 130 determines a steering angle on the basis of the steering component (the deflection angle φ) included in the steering angle information 158 stored in the storage unit 150 and reproduces the steering angle before the stop (step S208). Next, the traveling control unit 130 controls the steering apparatus 92 and causes steering to start at the reproduced steering angle (step S210).

Next, the traveling state determination unit 110 causes the own vehicle M to start on the basis of the target speed v set for each target position K on the trajectory generated by the first trajectory generation unit 112 or the second trajectory generation unit 126 (step S212). Thereby, the process of the flowchart ends.

According to the vehicle control apparatus 100 in the above-described second embodiment, because steering is started before the traveling of the own vehicle M is started, it is possible to cause the own vehicle M to more smoothly travel than when the steering is started after the own vehicle M is started.

While modes for carrying out the present invention have been described above using embodiments, the present invention is not limited to the embodiments. Various modification and substitutions can be made without departing from the spirit or scope of the present invention.

What is claimed is:

1. A vehicle control apparatus comprising:
a processor,
wherein the processor is configured to:
generate a locus of a target position of an own vehicle in a future as a trajectory of the own vehicle regardless of a traveling state of the vehicle;
control a steering apparatus adjusting a steering angle of the own vehicle on the basis of the generated trajectory;
cause, when the own vehicle is determined to be stopped temporarily, a non-transitory computer readable storage medium to store information indicating a steering component corresponding to the target position of the generated trajectory before the own vehicle has been stopped temporarily, and cause the own vehicle to be stopped temporarily while controlling the steering apparatus on the basis of the information,
while the own vehicle has been stopped temporarily, control the steering apparatus so that the steering apparatus is unable to be operated or invalidate an operation to the steering apparatus, to maintain the steering angle of the own vehicle on the basis of the information indicating the steering component stored in the non-transitory computer readable storage medium before the own vehicle has been stopped temporarily, and
when the own vehicle, which has been stopped temporarily, begins to travel, adjust the steering angle of the own vehicle on the basis of the steering angle of the own vehicle based on the information and a newly generated trajectory of the own vehicle.

2. The vehicle control apparatus according to claim 1, wherein the processor is configured to determine a steering angle when the traveling of the own vehicle starts on the basis of the information indicating the steering component stored in the non-transitory computer readable storage medium.

3. A vehicle control method of an on-vehicle computer, the method comprising:
generating a locus of a target position of an own vehicle in a future as a trajectory of the own vehicle regardless of a traveling state of the vehicle;
controlling a steering apparatus adjusting a steering angle of the own vehicle on the basis of the generated trajectory;
causing, when the own vehicle is determined to be stopped temporarily, a non-transitory computer readable storage medium to store information indicating a steering component of the target position of the generated trajectory before the own vehicle has been stopped temporarily, and causing the own vehicle to be stopped temporarily while controlling the steering apparatus on the basis of the information;
while the own vehicle has been stopped, control the steering apparatus so that the steering apparatus is unable to be operated or invalidate an operation to the steering apparatus, to maintain the steering angle of the own vehicle on the basis of the information indicating the steering component stored in the non-transitory computer readable storage medium before the own vehicle has been stopped temporarily; and
when the own vehicle, which has been stopped temporarily, begins to travel, adjusting the steering angle of the own vehicle on the basis of the steering angle of the own vehicle based on the information and a newly generated trajectory of the own vehicle.

4. A vehicle control method of an on-vehicle computer, the method comprising:
generate a locus of a target position of an own vehicle in a future as a trajectory of the own vehicle regardless of a traveling state of the vehicle;
control a steering apparatus adjusting a steering angle of the own vehicle on the basis of the generated trajectory;

cause, when the own vehicle is determined to be stopped temporarily, a non-transitory computer readable storage medium to store information indicating a steering component of the target position of the generated trajectory before the own vehicle has been stopped temporarily, and cause the own vehicle to be stopped temporarily while controlling the steering apparatus on the basis of the information;

while the own vehicle has been stopped, control the steering apparatus so that the steering apparatus is unable to be operated or invalidate an operation to the steering apparatus, to maintain the steering angle of the own vehicle on the basis of the information indicating the steering component stored in the non-transitory computer readable storage medium before the own vehicle has been stopped temporarily; and when the own vehicle, which has been stopped temporarily, begins to travel, adjust the steering angle of the own vehicle on the basis of the steering angle of the own vehicle based on the information and a newly generated trajectory of the own vehicle.

* * * * *